United States Patent Office 3,495,953
Patented Feb. 17, 1970

3,495,953
METHOD OF SEPARATING STRONTIUM CHLORIDE FROM MIXED SOLUTIONS USING ETHANOL
Remigius A. Gaska, Midland, and Robert A. Canute, Mount Pleasant, Mich., assignors to The Dow Chemical Company, Midland, Mich., a corporation of Delaware
No Drawing. Filed June 17, 1968, Ser. No. 737,378
Int. Cl. C01f *11/32;* B01d *9/02, 57/00*
U.S. Cl. 23—308                                5 Claims

ABSTRACT OF THE DISCLOSURE

In a process of separating strontium chloride from brine solutions containing strontium chloride and calcium chloride comprising selectively crystallizing the brine, selectively melting the resulting precipitate to produce a solid strontium chloride containing calcium chloride impurities, the improvement of washing the strontium chloride with ethanol to produce a substantially pure solid strontium chloride.

BACKGROUND OF THE INVENTION

Strontium is useful in preparing strontium compounds and as an alloying element. Sources of strontium include strontium chloride found as a minor constituent, e.g., a fraction of a percent, in aqueous brine solutions also containing other alkaline earth metal and alkali metal halides such as calcium chloride, sodium chloride, and potassium chloride.

Heretofore strontium chloride generally has been recovered from these brines by selective crystallization of the brines under controlled conditions of concentration and temperature to precipitate hydrated crystals of strontium chloride and calcium chloride. The hydrated chlorides may then be separated by selectively melting the calcium chloride hydrate, thereby separating the solid strontium chloride hydrate. Such a process is disclosed in U.S. Patent No. 1,831,251. However, strontium chloride recovered from such a process still contains undesirable impurities, e.g., calcium chloride.

A primary object of the present invention, therefore, is to provide an improved method of separating and recovering highly pure strontium chloride from brines or mixed halide solutions or from a strontium chloride solid product contaminated with calcium chloride hydrate.

These and other objects and advantages are found in the present process which is an improvement to the method of strontium chloride recovery practiced heretofore, i.e., of selective crystallization of metal values from brines and melting of the crystallized product to effect a separation of strontium chloride hydrate from the co-crystallized compound, e.g. calcium chloride hydrate. The present invention comprises washing the calcium chloride contaminated solid strontium chloride hydrate with the ethanol after the melting step thereby dissolving calcium chloride hydrate, and separating the ethanol washing solution from the remaining solid, thereby obtaining highly pure strontium chloride hydrate, which may then be dried to obtain anhydrous strontium chloride.

In the practice of the present invention the initial aqueous solution should contain from about 38 to about 43 weight percent calcium chloride and an amount of strontium chloride such that the weight ratio of $CaCl_2$ to $SrCl_2$ is at a maximum of about 100:1. Where the solution initially contains less than about 38 percent $CaCl_2$, the solution may be conventionally concentrated as by evaporation. The solution may also contain other alkaline earth metal and alkali metal halides, e.g., potassium chloride and sodium chloride. If sodium chloride is present, it may be removed by evaporation and filtration before further processing.

The aqueous solution is selectively cooled to, e.g., 25° C. to 15° C., to crystallize a mixture of $CaCl_2 \cdot 6H_2O$ and $SrCl_2 \cdot 2H_2O$ having a $CaCl_2$ to $SrCl_2$ weight ratio of the order to 20:1. The solid mixture is separated from the mother liquor by conventional means such as filtration or centrifugation.

The solid mixture is heated to, e.g., 28° C. to 50° C. to selectively melt the $CaCl_2 \cdot 6H_2O$ crystals. The melted portion is separated from the solid $SrCl_2 \cdot 2H_2O$ by filtration or similar means. However, as previously disclosed the solid strontium chloride still contains some impurities, e.g., 5–25 percent $CaCl_2$ as $CaCl_2 \cdot 6H_2O$.

We have unexpectedly discovered that washing this impurity containing solid strontium chloride hydrate with ethanol effectively removes substantially all the remaining $CaCl_2 \cdot 6H_2O$ impurity. The ethanol may be added to the impure strontium chloride in any conventional manner in an amount of from about 5 grams to about 50 grams per gram of $CaCl_2$ impurity, preferably from about 10 grams to about 30 grams per gram of $CaCl_2$ impurity. The ethanol selectively dissolves the $CaCl_2$ impurity to produce a substantially pure solid strontium chloride hydrate which can be dried to produce anhydrous $SrCl_2$ if desired.

Although the present invention is particularly adapted to be used in conjunction with a conventional recovery process for obtaining strontium chloride from brines and the like, it is to be understood that a strontium chloride hydrate containing calcium chloride produced by other methods also can be purified by the improved process of the present invention.

The following example is representative of the present invention but it is understood that the invention is not limited thereto.

EXAMPLE

A sample of aqueous brine solution was selected having the following weight percent analysis:

|  | Percent |
|---|---|
| $CaCl_2$ | 22.2 |
| NaCl | 5.2 |
| KCl | 1.4 |
| $SrCl_2$ | 0.45 |
| LiCl | 0.03 |

The solution was concentrated by evaporation to a specific gravity of 1.45, i.e., $CaCl_2$ concentration of about 42 percent. The brine was then cooled to 25° C. and filtered to remove any crystallized NaCl. The concentrated brine had an analysis by weight of:

|  | Percent |
|---|---|
| $CaCl_2$ | 42.1 |
| NaCl | 0.35 |
| KCl | 2.27 |
| $SrCl_2$ | 0.91 |

About 5 gallons of the concentrated brine was cooled to about 18° C. and held at that temperature for about 21 hours. The resulting precipitate was separated from the filtrate by filtration. The precipitate and filtrate analyses by weight percent are as follows:

| Compound | Precipitate | Filtrate |
|---|---|---|
| $CaCl_2$ | 43.8 | 40.1 |
| NaCl | 0.47 | 0.40 |
| KCl | 0.79 | 1.76 |
| $SrCl_2$ | 4.19 | 0.34 |

A portion of the precipitate was warmed at about 30° C. for about 20 hours to melt the $CaCl_2 \cdot 6H_2O$ impurity. Subsequent filtration yielded a cake and filtrate of the following analyses by weight percent:

| Compound | Cake | Filtrate |
|---|---|---|
| $CaCl_2$ | 12.46 | 44.75 |
| NaCl | 0.06 | 0.37 |
| KCl | 0.16 | 1.0 |
| $SrCl_2$ | 41.2 | 0.96 |

The cake purity is equivalent to 76.5 $SrCl_2$ on an anhydrous basis.

Ten grams of the filtered cake was washed with 40 grams of ethanol at about 25° C. and the resulting slurry filtered to yield the following cake analysis by weight percent:

Compound: Cake
- $CaCl_2$ ---------------------------------- 3.4
- $SrCl_2$ ---------------------------------- 49.9
- NaCl ----------------------------------- 0.03
- KCl ------------------------------------ 0.07

The cake purity is about 93.5 percent $SrCl_2$ on an anhydrous basis.

As shown in the above example, while selective crystallization and melting did improve the $CaCl_2$ to $SrCl_2$ ratio of the filtered cake, there remained significant $CaCl_2$ impurities as well as smaller KCl and NaCl impurities. The improvement of the present invention, an ethanol wash of the filtered cake, is extremely effective in purifying the $SrCl_2$ cake, thereby obtaining an acceptable commercial purity level.

The solid $SrCl_2$ product may be even further purified by rewashing the product with ethanol in a manner similar to the first washing.

In a similar matter other brines containing strontium chloride and calcium chloride may be processed by concentration, cooling, melting, and washing with ethanol as hereinbefore disclosed to produce substantially pure $SrCl_2$ product. Strontium chloride hydrate containing calcium chloride materials produced by other methods can be purified by the practice of the present invention.

Various modifications can be made in the present invention without departing from the spirit or scope thereof and it is understood that the invention is limited only as defined in the appended claims.

What is claimed is:
1. In a process of separating strantium chloride from aqueous solutions containing strontium chloride and calcium chloride comprising selectively crystallizing by evaporating and cooling said solution to precipitate mixed crystals of $CaCl_2 \cdot 6H_2O$ and $SrCl_2 \cdot 2H_2O$, selectively melting said mixture at a temperature of from about 28 to about 50° C. to provide a solid phase concentrated in $SrCl_2 \cdot 2H_2O$ but which contains calcium chloride as an impurity, and separating said solid phase from the co-produced calcium chloride rich liquid phase; the improvement which comprises washing the concentrated strontium chloride solid phase with ethanol to preferentially extract said calcium chloride impurity thereby to produce a substantially pure strontium chloride hydrate depleted in calcium chloride, and separating said strontium chloride hydrate solid phase from the residual calcium chloride containing ethanol solution.

2. The process as defined in claim 1 wherein the amount of ethanol used is from about 5 grams to about 50 grams per gram of $CaCl_2$ impurity in the concentrated precipitate.

3. The process as defined in claim 2 wherein the amount of ethanol used is from about 10 grams to about 30 grams per gram of $CaCl_2$ impurity in the concentrated precipitate.

4. The process as defined in claim 1 and including the step of drying said strontium chloride dihydrate at a temperature sufficient to remove the water of hydration therefrom thereby to provide a substantially anhydrous strontium chloride product.

5. The process as defined in claim 1 wherein the washing is repeated at least once.

References Cited
UNITED STATES PATENTS

| 2,030,659 | 2/1936 | Shreve | 23—90 |
| 2,980,502 | 4/1961 | Goodenough | 23—90 X |
| 3,029,133 | 4/1962 | Goodenough | 23—90 X |
| 3,239,318 | 3/1966 | Goodenough | 23—304 X |

NORMAN YUDKOFF, Primary Examiner

S. J. EMERY, Assistant Examiner

U.S. Cl. X.R.

23—90, 297, 299, 304